(12) United States Patent  
Geiter

(10) Patent No.: US 8,467,913 B2
(45) Date of Patent: Jun. 18, 2013

(54) METHOD AND ARRANGEMENT FOR PROVIDING A FAULT DIAGNOSIS FOR AT LEAST ONE SYSTEM

(75) Inventor: Denis Geiter, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1191 days.

(21) Appl. No.: 12/257,601

(22) Filed: Oct. 24, 2008

(65) Prior Publication Data

US 2009/0112379 A1    Apr. 30, 2009

Related U.S. Application Data

(60) Provisional application No. 60/984,026, filed on Oct. 31, 2007.

(51) Int. Cl.
| | | |
|---|---|---|
| *G01M 17/00* | (2006.01) | |
| *G06F 17/00* | (2006.01) | |
| *G06F 19/00* | (2011.01) | |
| *G07C 5/08* | (2006.01) | |

(52) U.S. Cl.
USPC ............ 701/3; 701/29.1; 701/29.7; 701/31.7; 701/31.8; 340/945

(58) Field of Classification Search
USPC ............... 701/1, 3, 14, 29, 31, 36, 29.1, 29.6, 701/29.7, 29.9, 31.6, 31.7, 31.8, 32.7, 34.2; 340/945, 963, 971; 244/1 R
See application file for complete search history.

(56) References Cited

U.S. PATENT DOCUMENTS

| 5,184,312 A | 2/1993 | Ellis |
| 5,638,383 A | 6/1997 | Wotzak |
| 7,460,541 B2 * | 12/2008 | Ward et al. ................. 370/395.1 |

(Continued)

FOREIGN PATENT DOCUMENTS

| DE | 103 43 963 A1 | 4/2005 |
| EP | 1 011 300 | 6/2000 |
| WO | 2007/057189 | 5/2007 |

OTHER PUBLICATIONS

Fischer, Nils "*Draft of a Plug and Play development environment for the optimization of interlaced avionics architectures*"; Ilmenau, den Jul. 9, 2007; 2007-07-09/078/IN00/2236.

*Primary Examiner* — Thomas Tarcza
*Assistant Examiner* — Edward Pipala
(74) *Attorney, Agent, or Firm* — Occhiuti Rohlicek & Tsao LLP

(57) ABSTRACT

The present invention provides a method for providing a fault diagnosis for at least one system, in particular of an aircraft. The method comprises: (a) providing a number N1, $n1\epsilon[1,\ldots,N1]$, of systems, wherein the n1-th system, in each case, provides a number N2, $n2\epsilon[1,\ldots,N2]$, of instances of a main function of a number N3, $n3\epsilon[1,\ldots,N3]$, of main functions of the aircraft; (b) providing a number N4, $n4\epsilon[1,\ldots,N4]$, of IMA modules, wherein in each case the n4-th IMA module provides resources at least for the respective n2-th instances of the main functions; (c) providing a generic diagnostic unit; (d) instantiating the generic diagnostic unit to provide a predetermined number N5, $n5\epsilon[1,\ldots,N5]$, of instances of the generic diagnostic unit; and (e) configuring the n5-th instance, in each case, of the generic diagnostic unit for adaption of the corresponding n5-th diagnostic unit to at least one system.

22 Claims, 7 Drawing Sheets

U.S. PATENT DOCUMENTS

| | | |
|---|---|---|
| 2004/0176887 A1 | 9/2004 | Kent |
| 2006/0064291 A1 | 3/2006 | Pattipatti |
| 2006/0155425 A1 | 7/2006 | Howlett |
| 2008/0027592 A1* | 1/2008 | Fernandez-Ramos ............ 701/3 |

* cited by examiner

METHOD AND ARRANGEMENT FOR PROVIDING A FAULT DIAGNOSIS FOR AT LEAST ONE SYSTEM

CROSS-REFERENCE TO RELATED APPLICATIONS

This application claims the benefit of U.S. Provisional Application No. 60/984,026, filed Oct. 31, 2007, the entire disclosure of which is hereby incorporated by reference.

FIELD OF THE INVENTION

The present invention relates to a method and an arrangement for providing a fault diagnosis of at least one system, in particular in the aviation and space travel sector.

BACKGROUND OF THE INVENTION

Although it can be applied in any sectors, the present invention is described in more detail in relation to an aircraft or a passenger aircraft.

In current aircraft, an IMA (Integrated Modular Avionics) module may integrate or map a large number of functions or main functions, such as, for example, a temperature or air-conditioning control, an undercarriage control, a pressure control or a door system control. The various functions or main functions are regularly supplied by different manufacturers or system suppliers and then integrated by the aircraft manufacturer in at least one IMA module of the aircraft.

Currently, each system supplier is thus developing their own BITE (Built-in-Test Equipment) implementation according to the requirements of the aircraft manufacturer. A BITE implementation of this type or BITE unit runs on each IMA module parallel to the respective use or application either within the application partition or in a partition of its own. As a function of the large number of different system suppliers, a large number of different BITE implementations also exist for a system or for a plurality of systems. In this case, the system suppliers offer singly, dually or even quadruply redundant architectures in combination with master/slave architectures or independently operating BITE applications. The large number of different BITE implementations leads to an additional outlay during the development and integration of a fault diagnosis for a system of an aircraft.

SUMMARY OF THE INVENTION

Accordingly, an object of the present invention is to provide a fault diagnosis for at least one system of an aircraft in an economical manner.

Furthermore, it is an object to provide an economical method and an economical arrangement for providing a fault diagnosis for at least one system of an aircraft, which gives rise to a minimal integration outlay.

At least one of these objects posed is achieved by a method for providing a fault diagnosis for at least one system, in particular of an aircraft, which has the following steps:

a) providing a number N1, $n1\epsilon[1, \ldots, N1]$, of systems $(S_1, \ldots, S_{N1})$, wherein the n1-th system, in each case $(S_1, \ldots, S_{N1})$, provides a number N2, $n2\epsilon[1, \ldots, N2]$, of instances $(HI_{n3n2})$ of a main function $(H_{n3})$ of a number N3, $n3\epsilon[1, \ldots, N3]$ of main functions $(H_1, \ldots, H_{N3})$ of the aircraft;

b) providing a number N4, $n4\epsilon[1, \ldots, N4]$, of IMA modules $(IMA_1, \ldots, IMA_{N4})$, wherein the n4-th IMA module $(IMA_{n4})$, in each case $(IMA_1, \ldots, IMA_{N4})$, provides resources at least for the respective n2-th instances $(HI_{1n2}, \ldots, HI_{N3n2})$ of the main functions $(H_1, \ldots, H_{N3})$;

c) providing a generic diagnostic unit (DE);

d) instantiating the generic diagnostic unit (DE) to provide a predetermined number N5, $n5\epsilon[1, \ldots, N5]$, of instances $(DE_1, \ldots, DE_{N5})$ of the generic diagnostic unit (DE); and e) configuring the n5-th instance $(DE_{n5})$, in each case, of the generic diagnostic unit (DE) for adaption of the respective n5-th diagnostic unit $(DE_{n5})$ to at least one system $(S1, \ldots, SN1)$.

At least one of the objects posed is also achieved by an arrangement for providing a fault diagnosis for at least one system, in particular of an aircraft, comprising:

a number N1, $n1\epsilon[1, \ldots, N1]$, of systems $(S_1, \ldots, S_{N1})$, wherein the n1-th system, in each case $(S_1, \ldots, S_{N1})$, provides a number N2, $n2\epsilon[1, \ldots, N2]$ of instances $(HI_{n3n2})$ of a main function $(H_{n3})$ of a number N3, $n3\epsilon[1, \ldots, N3]$ of main functions $(H_1, \ldots, H_{N3})$ of the aircraft;

a number N4, $n4\epsilon[1, \ldots, N4]$, of IMA modules $(IMA_1, \ldots, IMA_{N4})$, wherein the n4-th IMA module, in each case $(IMA_1, \ldots, IMA_{N4})$, provides resources at least for the respective n2-th instances $(HI_{1n2}, \ldots, HI_{N3n2})$ of the main functions $(H_1, \ldots, H_{N3})$; and a predetermined number N5, $n5\epsilon[1, \ldots, N5]$, of instances $(DE_1, \ldots, DE_{N5})$ of a generic diagnostic unit (DE), wherein the n5-th instance, in each case $(DE_1, \ldots, DE_{N5})$, of the generic diagnostic unit is configured for adaption of the corresponding n5-th diagnostic unit to at least one system.

In the above, the symbol "$\epsilon$" designates the mathematical relation "is an element of" and the square brackets "[ . . . ]" disclose elements forming a respective predetermined set. For example, $n\epsilon[1, \ldots, N]$ means that n is an element of the set of all (natural) numbers between 1 and N.

The previous BITE implementations or BITE units in each case had to satisfy the requirements of the aircraft manufacturer. These were therefore similar with respect to many part-functions, such as, for example, the communication protocol to be applied, the fault data storage, various rules with regard to fault correlation or the interfaces to the Centralized Maintenance System (CMS). The Applicant recognized that this similarity based on the same requirements set up by the aircraft manufacturers provides the possibility according to the invention of a generic diagnostic unit for various systems and also for various IMA modules. According to the invention, the generic diagnostic unit provided is instantiated, i.e. various instances of the generic diagnostic unit are provided. These instances of the generic diagnostic unit, which are provided, can be adapted to at least one system or else to a plurality of systems or also to an IMA module.

The instantiation of the generic diagnostic unit DE to provide the number N5, $n5\epsilon[1, \ldots, N5]$, of instances $DE_1, \ldots, DE_{N5}$ of the generic diagnostic unit DE designates the process of instantiation. The "instantiation" process is described, for example, in the document "IEEE Standard Glossary of Software Engineering Terminology", IEEE Standards Board, Sep. 28, 1990, on page 41.

The diagnostic unit may contain a diagnostic function or diagnostic relation.

Based on the provision of the generic diagnostic unit, the provision of the various instances of this generic diagnostic unit and the respective configuration to at least one system, the invention provides the following advantages:

Instead of a plurality of various BITE units or BITE implementations, according to the invention, only one single diagnostic unit, the generic diagnostic unit, is generated. Costs are therefore saved in development. Consequently, the outlay for integration is also minimized by the provision of only one single generic diagnostic unit.

As already stated above, an instance of the generic diagnostic unit may not only replace one BITE unit of a system or a system BITE, but it may also replace a BITE unit of an IMA module.

Advantageously, only a single generic diagnostic unit or BITE unit is necessary to provide the fault diagnosis, even for all systems and/or IMA modules of the aircraft. Consequently, there is also only a single manufacturer for this generic diagnostic unit. For this reason, even late modifications in terms of time of the generic diagnostic unit can be implemented very much more easily by the single manufacturer. The outlay in the case of a plurality of existing system suppliers such as in current aircraft would be much more complex and expensive.

According to one embodiment of the invention, the generic diagnostic unit is equipped with a number of configuration parameters. The configuration parameters are adjusted to configure the respective n5-th instance of the generic diagnostic unit.

According to a further embodiment, the generic diagnostic unit is configured as a rule-based, as a model-based or as a case-based generic diagnostic unit.

According to a further embodiment, the rule-based generic diagnostic unit has at least one configurable reference table.

According to a further embodiment, the model-based generic diagnostic unit has a system model of at least the systems to which the respective n5-th instances of the generic diagnostic unit are adapted.

According to a further embodiment, the case-based generic diagnostic unit is configured as a learning system, in particular based on a hidden Markov model or a neural network. Alternatively or additionally, the case-based generic diagnostic unit may also have a reference table.

According to a further embodiment, the number N1 of systems contains various systems of different manufacturers or system suppliers.

According to a further embodiment, the system is configured as an air-conditioning system, an undercarriage, a pressure regulating system or a door system. Furthermore, the main function may be configured as a temperature control, an undercarriage control, a pressure control or a door system control.

According to a further embodiment, the resources provided by the respective IMA module have a control device, in particular a microcontroller, and/or a memory device, in particular a working memory, and/or an operating system and/or at least one interface device and/or at least one predetermined service.

According to a further embodiment, the N4 IMA modules are configured identically.

According to a further embodiment, at least one instance of the generic diagnostic unit is configured in such a way that it is adapted to at least one system for fault diagnosis of the corresponding system, or the corresponding systems.

According to a further embodiment, at least one instance of the generic diagnostic unit is configured in such a way that it is adapted to at least one system for fault diagnosis of the corresponding system and/or of the corresponding systems and to at least one IMA module for fault diagnosis of the corresponding IMA module or the corresponding IMA modules. Thus, the BITE unit of the IMA module can also be mapped by an instance of the generic diagnostic unit of the present invention. Thus, the present invention opens up the possibility that the system diagnosis may also have available information from the fault detection of the IMA module. Thus, the system diagnosis is improved by an additional piece of useful information.

According to a further embodiment, one instance of the generic diagnostic unit is configured in such a way that it is adapted to at least one IMA module for fault diagnosis of the corresponding IMA module or the corresponding IMA modules.

According to a further embodiment, the respective system is equipped with at least one instance of the generic diagnostic unit for fault diagnosis of the corresponding system. To minimize necessary resources, the respective system may be equipped with only a single instance of the generic diagnostic unit.

According to a further embodiment, the respective IMA module is equipped with a single instance of the generic diagnostic unit for fault diagnosis of at least one system, in particular the N1 systems, and of the corresponding IMA module. One advantage of a single, central instance of the generic diagnostic unit for the respective IMA module is that the usage or the occupation of the resources of the IMA module is minimized. This applies, in particular, to the time or calculation time and the memory requirement.

According to a further embodiment, the N5 instances of the generic diagnostic unit are integrated in a number N7 of further IMA modules, which are independent of the provision of the resources for the instances of the main functions.

One advantage of this embodiment is the centralization of the arrangement of the instances of the diagnostic units and the possible reduction in the number of diagnostic units. Integration times and costs are saved by this centralistic approach. Furthermore, the architecture being produced is less complex and the diagnostic units are independent of the status or the operating capacity of the respective system. Furthermore, a static connection to the Centralized Maintenance System of the aircraft is possible in this architecture. Furthermore, it is possible to integrate the N5 instances of the generic diagnostic unit into a number N7 of IMA modules inherently provided in the aircraft, for example the flight warning system.

According to a further embodiment, a single instance of the generic diagnostic unit is provided, which is configured in such a way that it is adapted to at least the N1 systems, in particular additionally to the N4 IMA modules. This single instance in particular is integrated into the Centralized Maintenance System (CMS). One advantage of this preferred development is the increased centralization of the fault diagnosis.

According to a further embodiment, the respective configured n5-th instance of the generic diagnostic unit receives fault detection data from at least one fault detection unit or monitoring unit and generates fault result data as a function of the received fault detection data and the respective configuration parameters, by means of which the corresponding n5-th instance of the generic diagnostic unit is configured.

According to a further embodiment, the N5 instances of the generic diagnostic unit send the respective generated fault result data to the Centralized Maintenance System of the aircraft.

BRIEF DESCRIPTION OF THE DRAWINGS

The invention will be described in more detail below with the aid of embodiments with reference to the accompanying figures, in which.

In the figures, the same reference numerals designate the same or functionally the same components, if nothing is stated to the contrary.

DETAILED DESCRIPTION OF THE DRAWINGS

Figure 1:
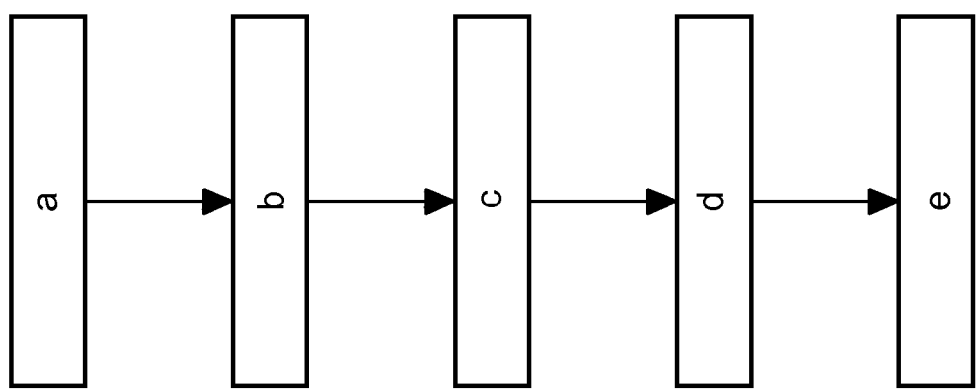
FIG. 1 shows a schematic flow chart of a method for providing a fault diagnosis for at least one system of an aircraft according to an embodiment.

FIG. 1 shows a schematic flow chart of an embodiment of a method for providing a fault diagnosis for at least one system $S_1, \ldots, S_{N1}$, in particular of an aircraft.

The method according to the embodiment will be described below with the aid of the block diagram in FIG. 1 with reference to the block diagram of FIG. 2. The method of the embodiment according to FIG. 1 comprises method steps a) to e):

Method Step a)

A number N1, $n1 \in [1, \ldots, N1]$ of systems $S_1, \ldots, S_{N1}$ is provided, wherein the n1-th system $S_1, \ldots, S_{N1}$, in each case, provides a number N2, $n2 \in [1, \ldots, N2]$, of instances $HI_{n3n2}$ of a main function $H_{n3}$ of a number N3, $n3 \in [1, \ldots, N3]$ of main functions $H_1, \ldots, H_{N3}$ of the aircraft.

Method Step b)

Furthermore, a number N4, $n4 \in [1, \ldots, N4]$, of IMA modules ($IMA_1, \ldots, IMA_{N4}$) is provided, wherein the n4-th IMA module $IMA_{n4}$, in each case, provides resources at least to the respective n2-th instances $HI_{1n2}, \ldots, HI_{N3n2}$ of the main functions $H_1, \ldots, H_{N3}$.

Figure 2:
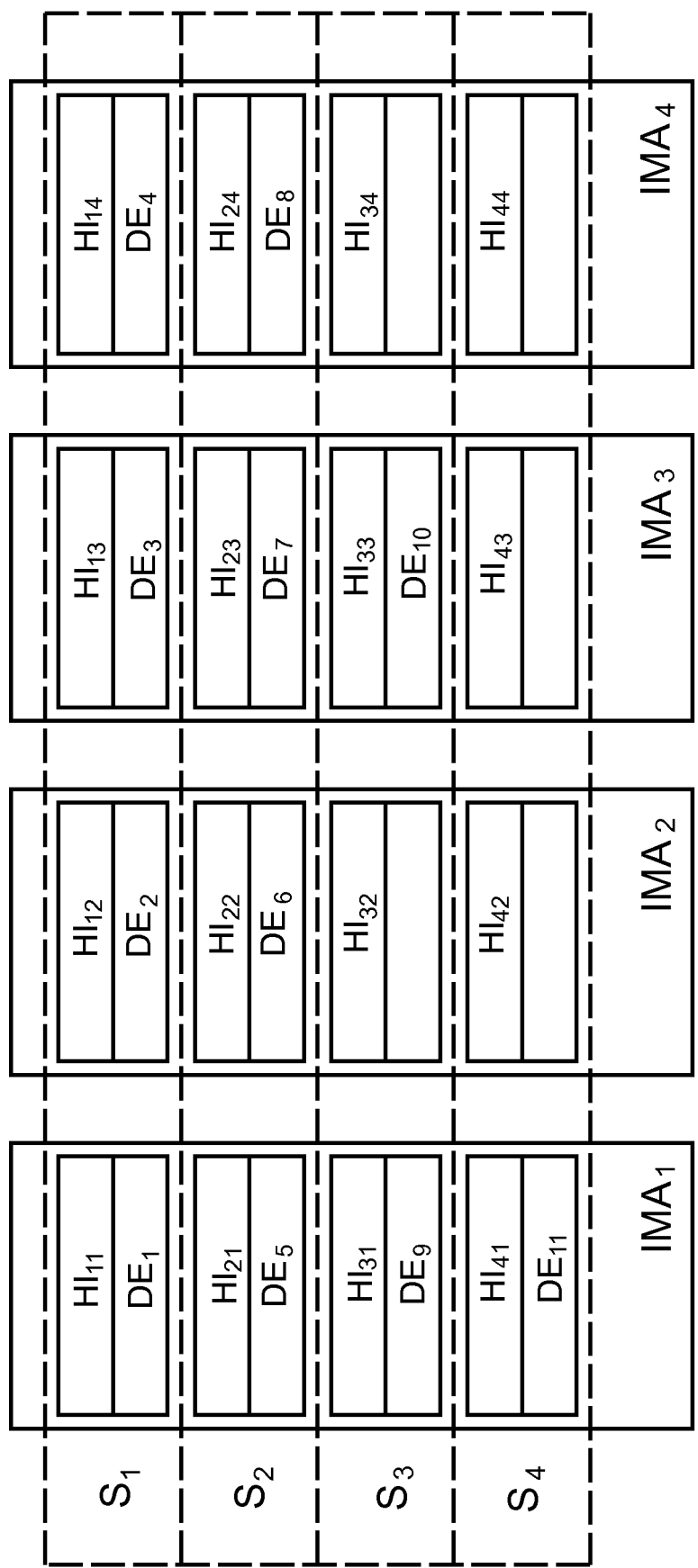
FIG. 2 shows a schematic arrangement of the systems and IMA modules according to an embodiment.

A schematic arrangement of the systems $S_1, \ldots, S_{N1}$ and IMA modules $IMA_1, \ldots, IMA_{N4}$ is shown by way of example in FIG. 2. In this case, the number N1 of systems $S_1, \ldots, S_{N1}$ preferably contains various systems $S_1, \ldots, S_{N1}$ of different manufacturers or system suppliers. Furthermore, the system may be configured as an air-conditioning system, an undercarriage, a pressure regulating system or a door system. The main function may in this case be configured as a temperature control, an undercarriage control, a pressure control, a door system control or the like. The resources provided by the respective IMA modules $IMA_{n4}$ may comprise a control device, in particular a microcontroller, and/or a memory device, in particular a working memory and/or an operating system and/or at least one interface device and/or at least one predetermined service. Furthermore, the N4 IMA modules $IMA_1, \ldots, IMA_{N4}$ may be identically configured.

Method Step c)

A generic diagnostic unit DE is provided. The generic diagnostic unit DE is preferably equipped with a number N6 of configuration parameters KP, wherein the configuration parameters KP are adjusted to configure the respective n5-th instances $DE_{n5}$ of the generic diagnostic unit DE.

The generic diagnostic unit DE may be configured, for example, as a rule-based, a model-based, or as a case-based generic diagnostic unit DE. The rule-based, generic diagnostic unit DE may, for example, have a configurable reference table.

The model-based, generic diagnostic unit DE preferably has a system model at least of the systems, to which the respective n5-th instances $DE_{n5}$ of the generic diagnostic DE are adapted.

Furthermore, the case-based, generic diagnostic unit DE may be configured as a learning system, for example based on a hidden Markov model or a neural network. Additionally or alternatively, the case-based generic diagnostic unit DE may also have a configurable reference table.

FIG. 2 depicts four systems $S_1$-$S_4$ and four hardware IMA modules $IMA_1$-$IMA_4$. Therefore, the number N1 of systems in FIG. 2 is four, without restriction of generality. Likewise, the number N3 of main functions $H_{N3}$ is four (N3=4). The number N2 of instances of a main function $H_{N3}$ may be different depending on the respective systems $S_1$-$S_4$. Without restriction of generality, each of the four systems S1-S4 depicted in FIG. 2 has four instances $HI_{11}$-$HI_{14}$; $HI_{21}$-$HI_{24}$; $HI_{31}$-$HI_{32}$; $HI_{41}$-$HI_{44}$. The number N4 of IMA modules $IMA_1$-$IMA_4$ is, for example, also four (N4=4). Furthermore, the number N5 of instances $DE_{n5}$ of the generic diagnostic unit DE may be different for each system. Thus, for example, the first system $S_1$ has four instances $DE_1$ to $DE_4$ of the generic diagnostic unit DE. In contrast to this, the third system S3 only has two instances $DE_9$, $DE_{10}$ of the generic diagnostic unit DE. In this case, the first module $IMA_1$ integrates the ninth instance $DE_9$ of the generic diagnostic unit DE and the third IMA module $IMA_3$ integrates the tenth instance $DE_{10}$ of the diagnostic unit DE. A system, for example the fourth system $S_4$ may also have only one instance $DE_{11}$ of the generic diagnostic unit DE. According to the example of FIG. 2, the fourth system $S_4$ in the first module $IMA_1$ only integrates the eleventh instance $DE_{11}$ of the diagnostic unit DE.

FIGS. 3 to 6 show schematic block diagrams of various embodiments of an arrangement for providing a fault diagnosis for at least one system $S_1, \ldots, S_{N1}$ of an aircraft. The various embodiments of the arrangement according to FIGS. 3 to 6 share a number N1 of systems $S_1, \ldots, S_{N1}$, a number N4 of IMA modules $IMA_1, \ldots, IMA_{N4}$, and a predetermined number N5 of instances $DE_1, \ldots, DE_{N5}$ of a generic diagnostic unit DE. Herein, the respective n1-th systems $S_1, \ldots, S_{N1}$ provide a number N2, $n2 \in [1, \ldots, N2]$ of instances $HI_{n3n2}$ of a main function $H_{n3}$ of a number N3, $n3 \in [1, \ldots, N3]$, of main functions $H_1, \ldots, H_{N3}$ of the aircraft. Furthermore, the n4-th IMA module $IMA_{n4}$ provides resources at least for the respective n2-th instances $HI_{1n2}, \ldots, HI_{N3n2}$ of the main functions $H_1, \ldots, H_{N3}$. Furthermore, the predetermined number N5, $n5 \in [1, \ldots, N5]$, of instances $DE_1, \ldots, DE_{N5}$ of the generic diagnostic unit DE is configured in such a way that the respective n5-th instances $DE_{n5}$ of the generic diagnostic unit DE are configured for adaption of the respective n5-th diagnostic units $DE_{n5}$ to at least one system $S1, \ldots, SN1$.

Figure 3:
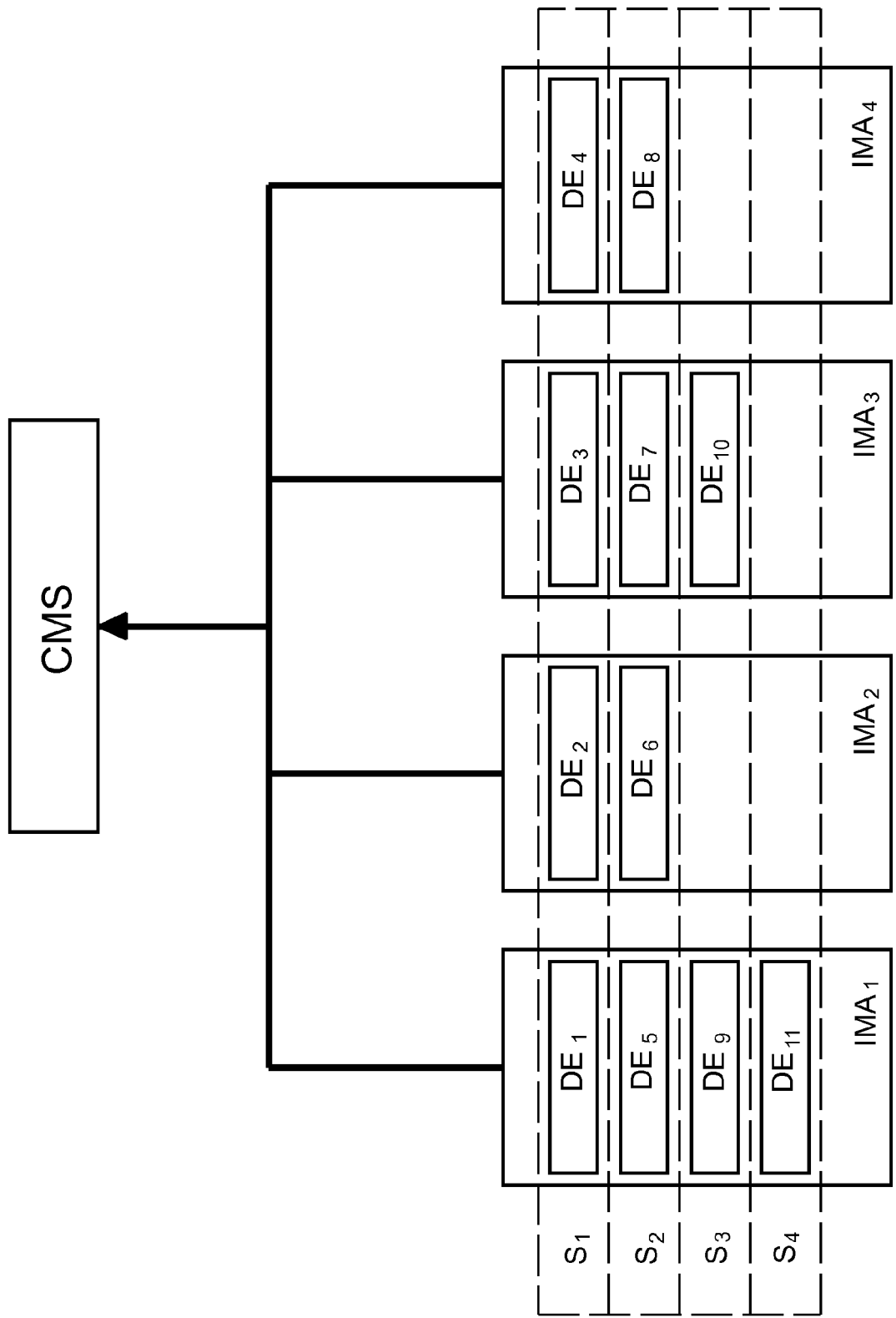
FIG. 3 shows a schematic block diagram of an arrangement according to a first embodiment.

According to the first embodiment of the arrangement according to FIG. 3, the first system S1 has four instances $DE_1$-$DE_4$ of the generic diagnostic unit DE. The four instances $DE_1$-$DE_4$ are redundant with respect to one another and arranged in each case in one of the four IMA modules $IMA_1$-$IMA_4$. The same applies to the second system $S_2$. The third system S3 has two redundant instances $DE_9$, $DE_{10}$, which are configured in such a way that they are adapted to the third system S3 for fault diagnosis of the third system $S_3$. The two instances $DE_9$, $DE_{10}$ of the generic diagnostic unit DE are redundant and are arranged in two IMA modules, here in the IMA modules $IMA_1$ and $IMA_3$.

The fourth system $S_4$ has only a single instance $DE_{11}$ of the generic diagnostic unit DE, which is arranged in the first IMA module $IMA_1$, for example. The IMA modules $IMA_1$, ..., $IMA_4$ or the various instances $DE_1$-$DE_{11}$ of the generic diagnostic unit DE are coupled, for example, to a Centralized Maintenance System CMS of the aircraft by means of a bus system. The various instances $DE_1$-$DE_{11}$ of the generic diagnostic unit DE can transmit fault result data to the Centralized Maintenance System CMS by means of this coupling. This is described in detail in FIG. 7.

Without restriction of generality, FIGS. 3 to 6 do not show the instances $HI_{n3n2}$ of the various main functions $H_{N3}$ for reasons of clarity.

Figure 4:
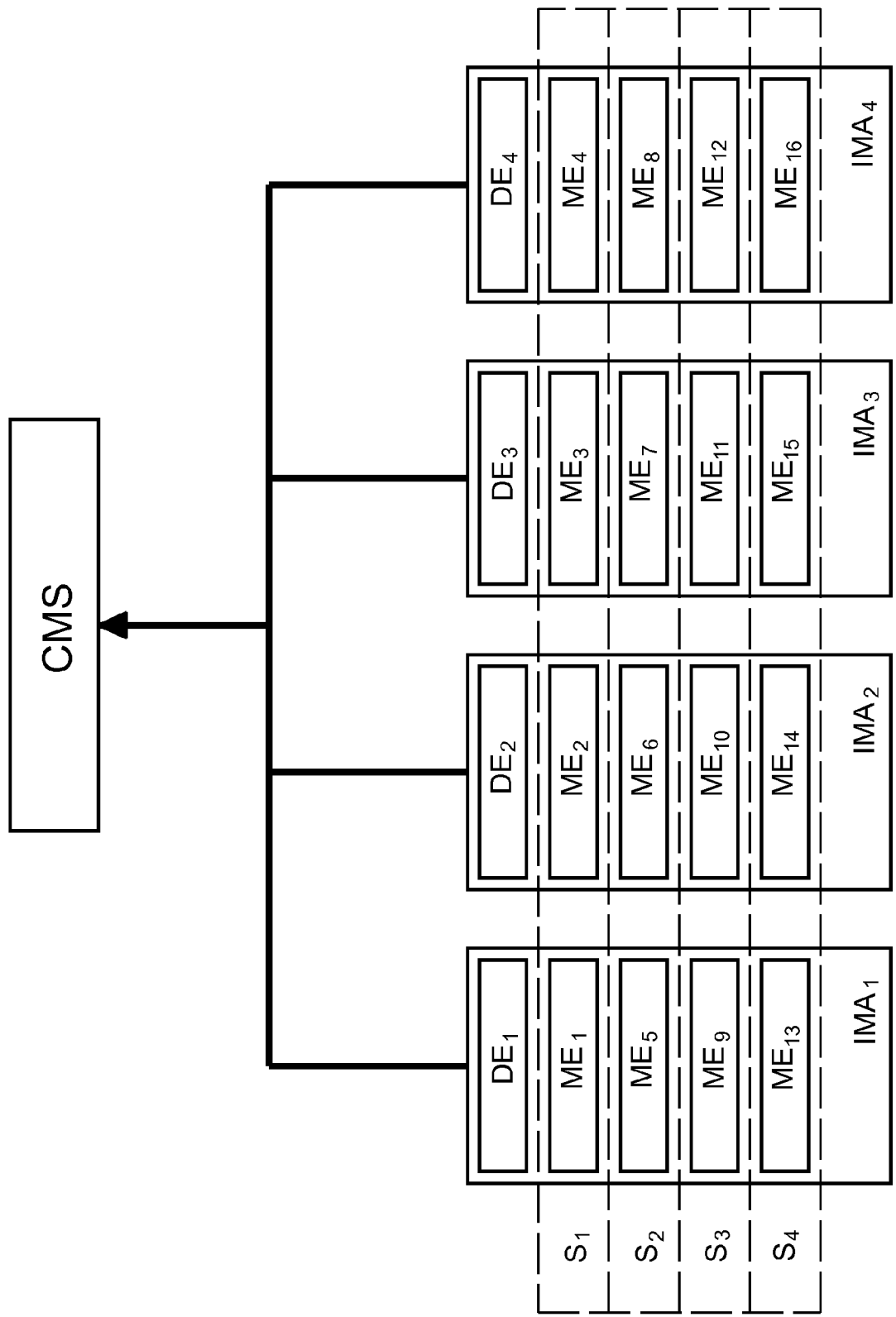
FIG. 4 shows a schematic block diagram of an arrangement according to a second embodiment.

FIG. 4 shows a schematic block diagram of an arrangement according to a second embodiment. The second embodiment according to FIG. 4 differs from the first embodiment according to FIG. 3 in particular in that the IMA modules $IMA_1$-$IMA_4$ only have a single instance $DE_1$-$DE_4$, respectively, of the generic diagnostic unit DE, for fault diagnosis of the N1 systems $S_1$-$S_4$ and of the corresponding IMA modules $IMA_1$-$IMA_4$. For example, the first instance $DE_1$ of the generic diagnostic unit is configured in such a way that it is adapted, for fault diagnosis, to the first system $S_1$, the second system $S_2$, the third system $S_3$, the fourth system $S_4$, and to the first IMA module $IMA_1$ in which it is integrated.

Furthermore, each system $S_1$-$S_4$ in each IMA module $IMA_1$-$IMA_4$ has a monitoring unit $ME_1$-$ME_{16}$. The respective monitoring units $ME_1$-$ME_{16}$ are suitable for providing fault detection data FD of the respective main functions $H_{n3}$ of the respective systems $S_1$-$S_4$ or the respective modules $IMA_1$-$IMA_4$. This is described in detail with reference to FIG. 7.

Figure 5:
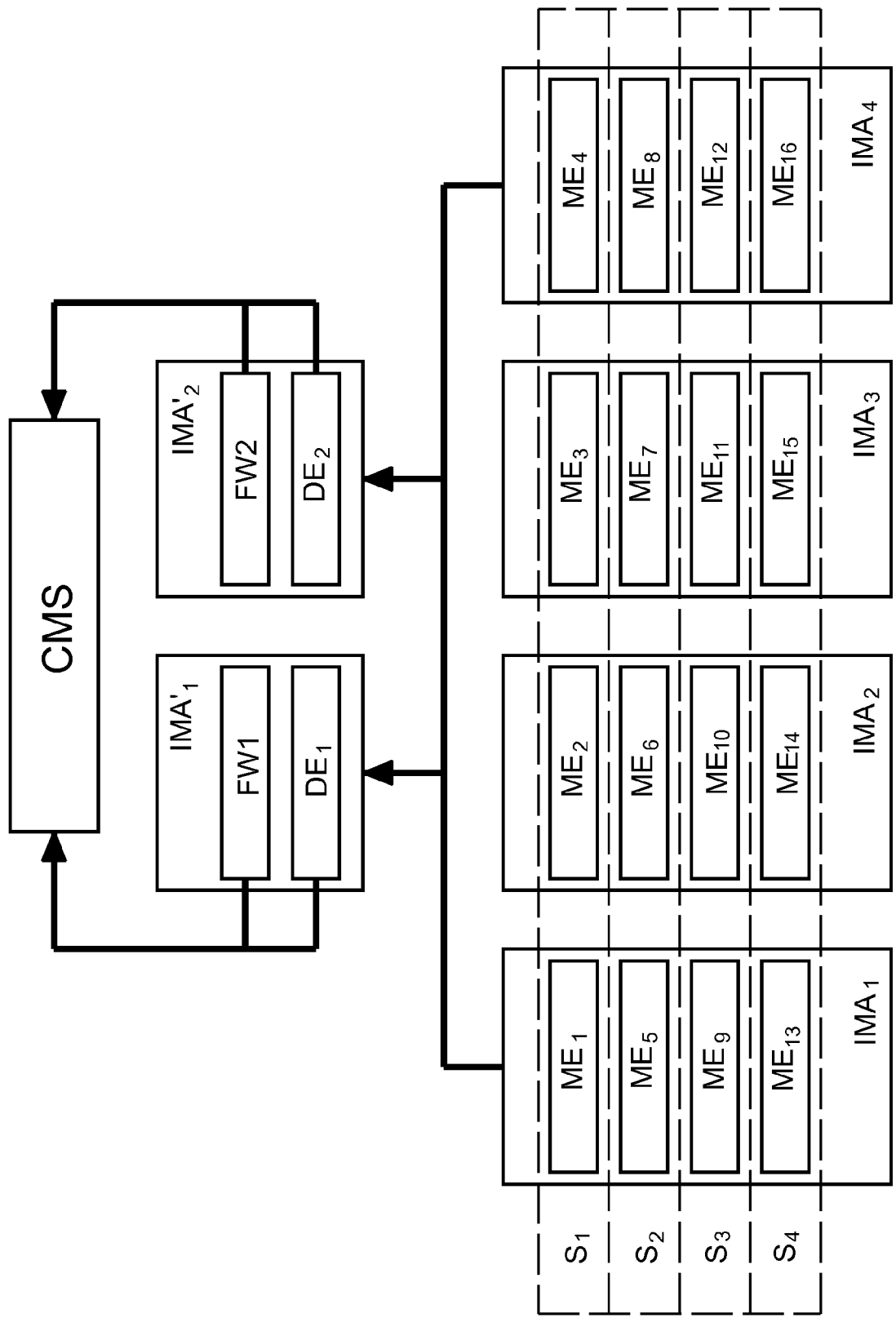
FIG. 5 shows a schematic block diagram of an arrangement according to a third embodiment.

FIG. 5 shows a schematic block diagram of an arrangement according to a third embodiment. The third embodiment according to FIG. 5 differs from the second embodiment according to FIG. 4 in particular in that the N5 instances $DE_1$-$DE_{N5}$ of the generic diagnostic unit DE are integrated in a number N7 of further IMA modules $IMA'_1$, ..., $IMA'_{N7}$, which are independent of the provision of resources for the instances $HI_1$, ..., $HI_{N3N2}$ of the main functions $H_1$, ..., $H_{N3}$. Without restriction of generality, in the exemplary view according to FIG. 5, N5=2 and N7=2. In particular, the N5 instances $DE_1$, $DE_2$ of the generic diagnostic unit DE may be provided in IMA modules $IMA'_1$, ..., $IMA'_2$ inherently provided in the aircraft. Such an inherently-provided IMA module $IMA'_1$, $IMA'_2$ is, for example, the Flight Warning System. The flight warning systems $IMA'_1$, and $IMA'_2$ in each case have a flight warning function FW1, FW2, for example.

Figure 6:
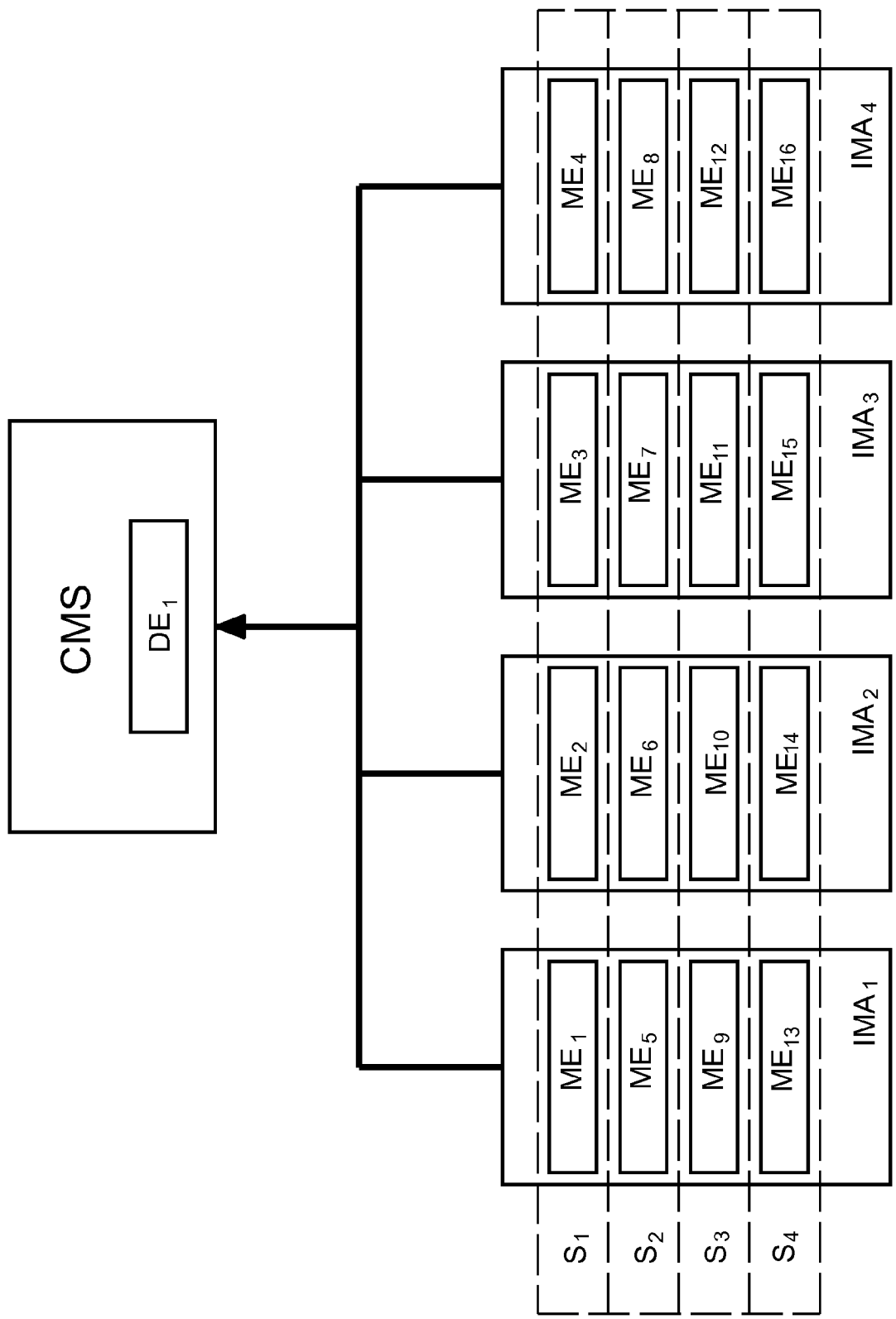
FIG. 6 shows a schematic block diagram of an arrangement according to a fourth embodiment.

FIG. 6 shows a schematic block diagram of an arrangement according to a fourth embodiment. The fourth embodiment according to FIG. 6 is distinguished in that only a single instance $DE_1$ of the generic diagnostic unit DE is provided. This single instance $DE_1$ is configured in such a way that it is adapted at least to the N1 systems $S_1$, ..., $S_{N1}$ and in particular additionally to the N4 IMA modules $IMA_1$, ..., $IMA_{N4}$. Furthermore, this single instance $DE_1$ is preferably integrated into the centralized maintenance system CMS of the aircraft.

Figure 7:
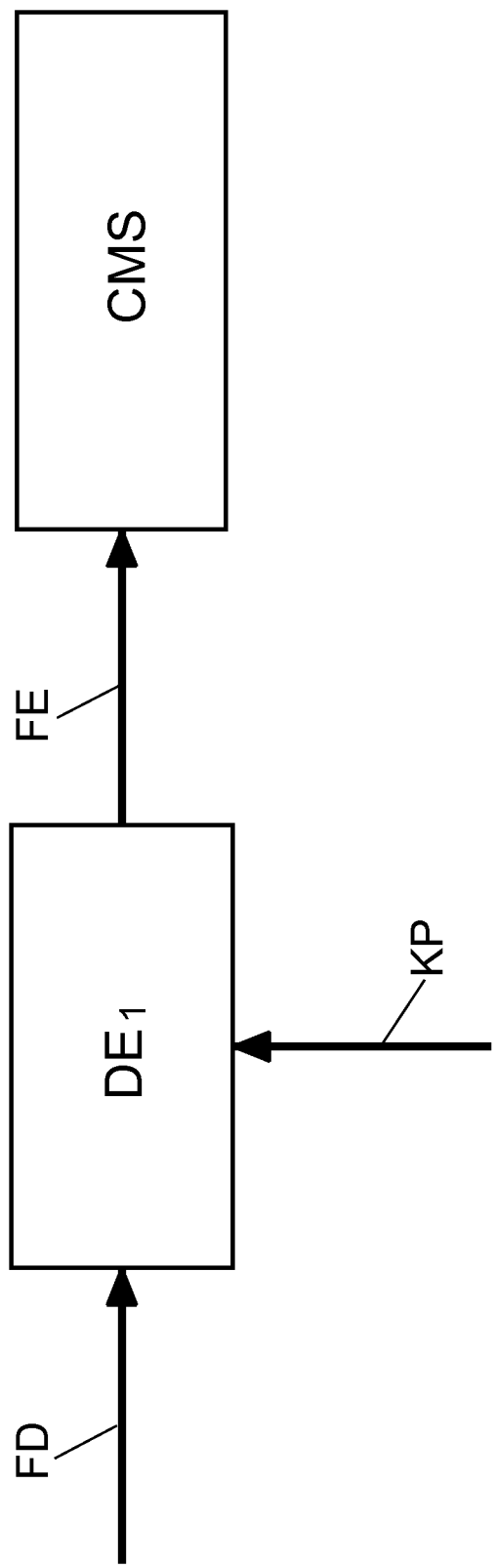
FIG. 7 shows a schematic block diagram of an instance of a generic fault diagnostic unit, which is coupled to a centralized maintenance system.

FIG. 7 shows a schematic block diagram of an instance $DE_1$ of the generic diagnostic unit DE, which is coupled to the centralized maintenance system CMS. Without restriction of generality, FIG. 7 shows only the first instance $DE_1$ with the coupling to the centralized maintenance system CMS. The same applies to the remaining instances $DE_2$-$DE_{11}$ of the generic diagnostic unit shown in FIGS. 2 to 6.

The first instance $DE_1$ of the generic diagnostic unit DE according to FIG. 7 receives fault detection data FD from a fault detection unit or monitoring unit $ME_1$-$ME_{16}$ (see for example FIGS. 4 to 6) and generates fault result data as a function of the received fault detection data FD and the respective configuration parameters KP by means of which the corresponding instance, here the first instance $DE_1$, of the generic diagnostic unit DE is configured.

The number N5 of instances $DE_1$, ..., $DE_{N5}$ of the generic diagnostic unit DE preferably sends the respective generated fault result data FE to the centralized maintenance system CMS.

Although the present invention has been described with the aid of preferred embodiments, it is not limited thereto but can be modified in diverse ways.

What is claimed is:

1. A fault diagnosis apparatus for at least one system of an aircraft, the fault diagnosis system comprising:
   a number N1, n1 ∈[1, ..., N1], of systems, wherein the n1-th system, in each case, is configured to provide a number N2, n2 ∈[1, ..., N2], of instances of a main function of a number N3, n3 ∈[1, ..., N3] of main functions of the aircraft;
   a number N4, n4 ∈[1, ..., N4], of IMA modules, wherein the n4-th IMA module, in each case, is configured to provide resources at least to the respective n2-th instances of the main functions;
   a generic diagnostic unit comprising
   a predetermined number N5, n5 ∈[1, ..., N5], of instances of the generic diagnostic unit; and
   wherein, the n5-th instance, in each case, of the generic diagnostic unit is configured for adaption of the corresponding n5-th diagnostic unit to at least one system.

2. The fault diagnosis apparatus according to claim 1, wherein the generic diagnostic unit comprises a number N6 of configuration parameters, the configuration parameters being adjusted to configure the n5-th instance, in each case, of the generic diagnostic unit.

3. The fault diagnosis apparatus according to claim 2, comprising at least one fault detection unit or a monitoring unit; and wherein the respective configured n5-th instance of the generic diagnostic unit is configured to receive fault detection data from and generates fault result data as a function of the received fault detection data and the respective configuration parameters, by means of which the corresponding n5-th instance of the generic diagnostic unit is configured.

4. The fault diagnosis apparatus according to claim 3, wherein the N5 instances of the generic diagnostic unit are configured to send the respective generated fault result data to a centralized maintenance system of the aircraft.

5. The fault diagnosis apparatus according to claim 1, wherein the generic diagnostic unit comprises a rule-based or model-based, or case-based generic diagnostic unit.

6. The fault diagnosis apparatus according to claim 5, wherein the rule-based or case-based generic diagnostic unit comprises a configurable reference table.

7. The fault diagnosis apparatus according to claim 5, wherein the model-based generic diagnostic unit comprises a system model of at least the systems to which the respective n5-th instances of the generic diagnostic unit are adapted.

8. The fault diagnosis apparatus according to claim 5, wherein the case-based generic diagnostic unit comprises a learning system.

9. The fault diagnosis apparatus according to claim 1, wherein the number N1 of systems comprises various systems of different manufacturers.

10. The fault diagnosis apparatus according to claim 1, wherein at least one system comprises an air-conditioning system or an undercarriage or a pressure regulating system or a door system or at least one main function comprises a temperature control function or an undercarriage control function or a pressure control function or a door system control function.

11. The fault diagnosis apparatus according to claim 1, wherein the resources provided by the respective IMA module comprise at least one of a control device, a memory device, an operating system, an interface device and a predetermined service.

12. The fault diagnosis apparatus according to claim 1, wherein the N4 IMA modules are configured identically.

13. The fault diagnosis apparatus according to claim 1, wherein at least one instance of the generic diagnostic unit is configured in such a way that it is adapted to at least one system for fault diagnosis of the corresponding system or the corresponding systems.

14. The fault diagnosis apparatus according to claim 13, characterized in that the respective system comprises at least one instance of the generic diagnostic unit for fault diagnosis of the corresponding system.

15. The fault diagnosis apparatus according to claim 13, comprising a single instance of the generic diagnostic unit, which is configured in such a way that it is at least adapted to the N1 systems for fault diagnosis of the N1 systems.

16. The fault diagnosis apparatus according to claim 15, wherein the single instance is configured in such a way that it is additionally adapted to the N4 IMA modules for fault diagnosis of the N4 IMA modules.

17. The fault diagnosis apparatus according to claim 15, wherein the aircraft comprises a centralized maintenance system and, wherein the single instance is integrated into the centralized maintenance system of the aircraft.

18. The fault diagnosis apparatus according to claim 13, wherein the N5 instances of the generic diagnostic unit are integrated into a number N7 of further IMA modules, which are independent of the provision of the resources for the instances of the main functions.

19. The fault diagnosis apparatus according to claim 18, wherein the N7 IMA modules are inherently provided in the aircraft.

20. The fault diagnosis apparatus according to claim 1, wherein at least one instance of the generic diagnostic unit is configured in such a way that it is adapted to at least one IMA module for fault diagnosis of the corresponding IMA module or the corresponding IMA modules.

21. The fault diagnosis apparatus according to claim 20, wherein the respective IMA module comprises an individual instance of the generic diagnostic unit for fault diagnosis of at least one system and of the corresponding IMA module.

22. An arrangement for providing a fault diagnosis for at least one system, in particular of an aircraft, comprising:

a number $N1$, $n1 \in [1, \ldots, N1]$, of systems, wherein the n1-th system, in each case, provides a number $N2$, $n2 \in [1, \ldots, N2]$ of instances of a main function of a number $N3$, $n3 \in [1, \ldots, N3]$ of main functions of the aircraft;

a number $N4$, $n4 \in [1, \ldots, N4]$, of IMA modules, wherein the n4-th IMA module, in each case, provides resources at least for the respective n2-th instances of the main functions; and a predetermined number $N5$, $n5 \in [1, \ldots, N5]$, of instances of a generic diagnostic unit, wherein the n5-th instance, in each case, of the generic diagnostic unit is configured for adaption of the corresponding n5-th diagnostic unit to at least one system.

\* \* \* \* \*